United States Patent [19]
Koike et al.

[11] Patent Number: 5,822,679
[45] Date of Patent: Oct. 13, 1998

[54] CATV COMMUNICATION SYSTEM AND A CATV CENTER EQUIPMENT AND CATV TERMINAL UNITS

[75] Inventors: Masakazu Koike; Osamu Yoshida; Wataru Kuroiwa, all of Tokyo, Japan

[73] Assignee: Kabushiki Kaisha Toshiba, Kawasaki, Japan

[21] Appl. No.: 665,970

[22] Filed: Jun. 21, 1996

[30] Foreign Application Priority Data

Jun. 23, 1995 [JP] Japan .................................. 7-157789

[51] Int. Cl.⁶ ........................................................ H01N 7/14
[52] U.S. Cl. ................................ 455/5.1; 348/7; 348/12; 370/436
[58] Field of Search .................................. 348/6, 7, 8, 9, 348/10, 12, 13; 455/3.1, 4.1, 4.2, 5.1, 6.1, 6.2; 370/431, 436, 437, 438, 458, 459, 485, 486, 487, 489, 490

[56] References Cited

U.S. PATENT DOCUMENTS

| | | |
|---|---|---|
| 5,481,542 | 1/1996 | Logston et al. .................. 348/7 X |
| 5,606,725 | 2/1997 | Hart ................................... 348/12 X |
| 5,680,398 | 10/1997 | Robinson ............................ 370/458 |

FOREIGN PATENT DOCUMENTS 63-272138  11/1988  Japan .

*Primary Examiner*—Nathan J. Flynn
*Attorney, Agent, or Firm*—Foley & Lardner

[57] ABSTRACT

In the CATV communication system, each channel comprises a down control channel which employs a carrier wave (fd0) and accommodates a down delay control channel slot and down assignment control channel slots therein, a plurality of down communication channels which employ carrier waves (fd1 to fd4) different from that employed in the down control channel and accommodate down communication data channel slots therein, and a plurality of up channels which employ carrier waves (fu0 to fu3) and accommodate up delay control channel slots, up assignment control channel slots, and communication data channel slots therein.

4 Claims, 18 Drawing Sheets

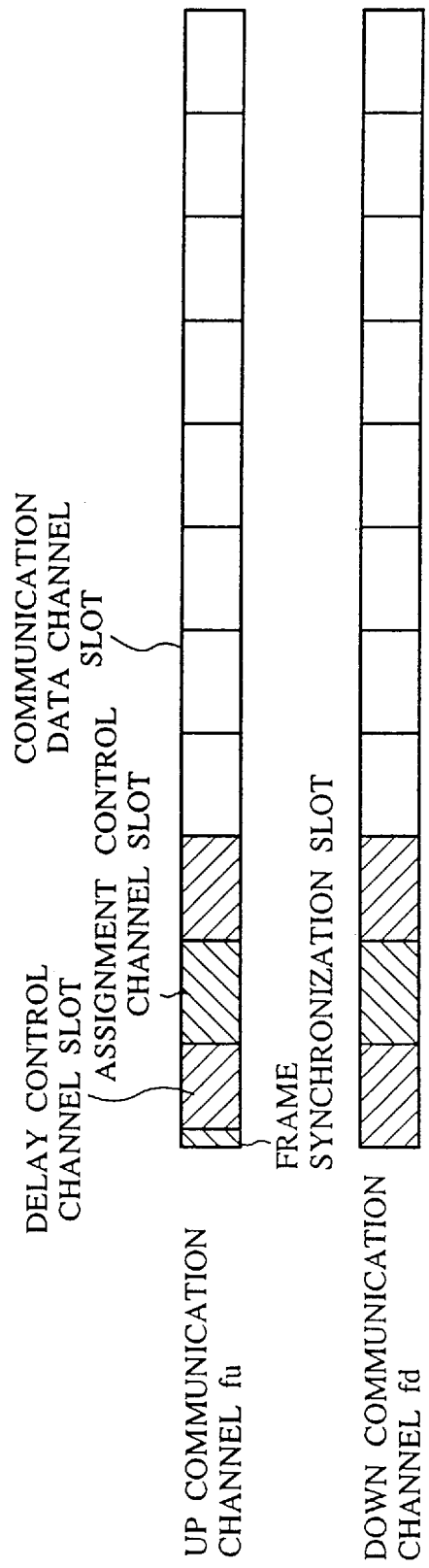

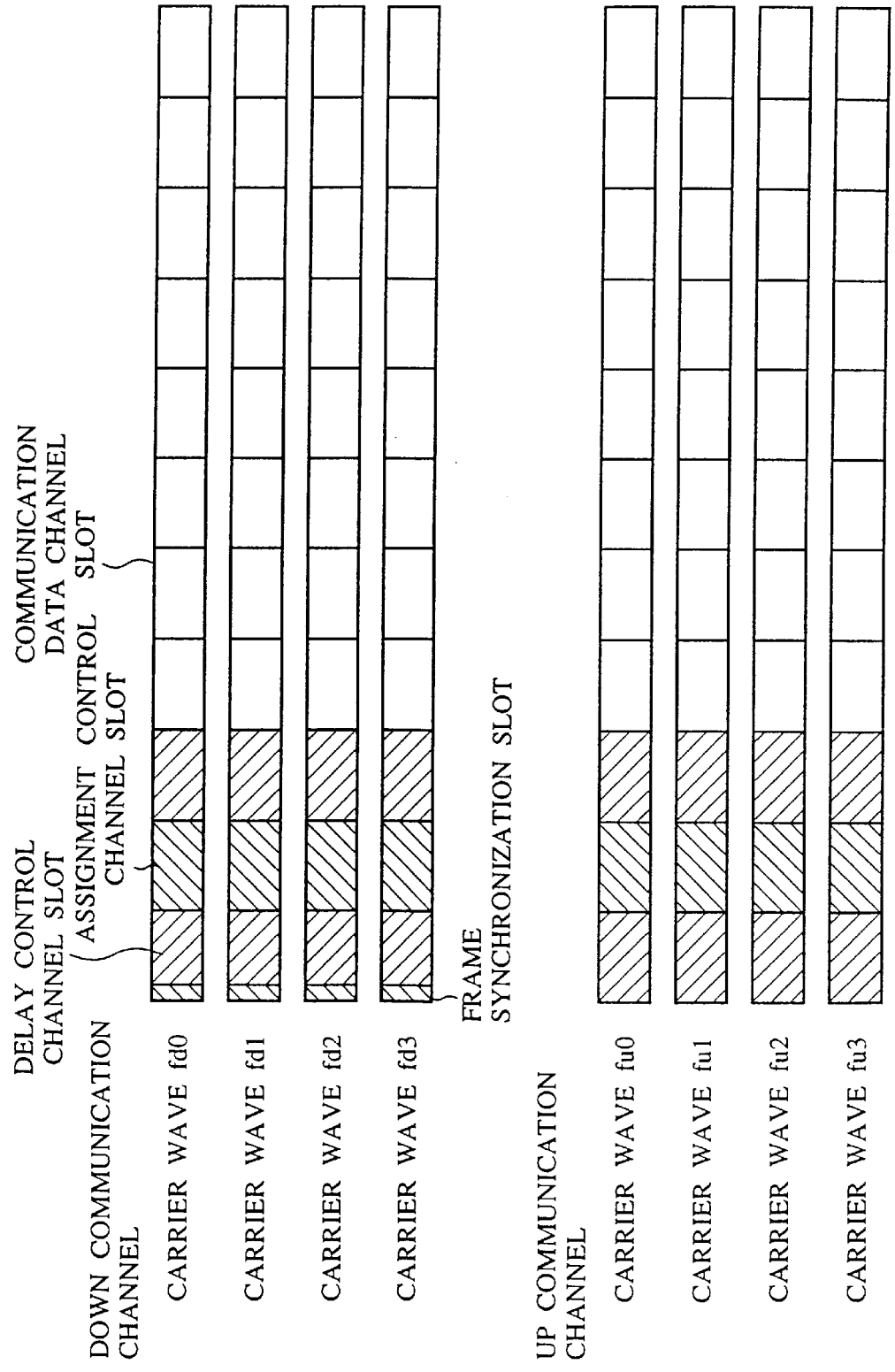

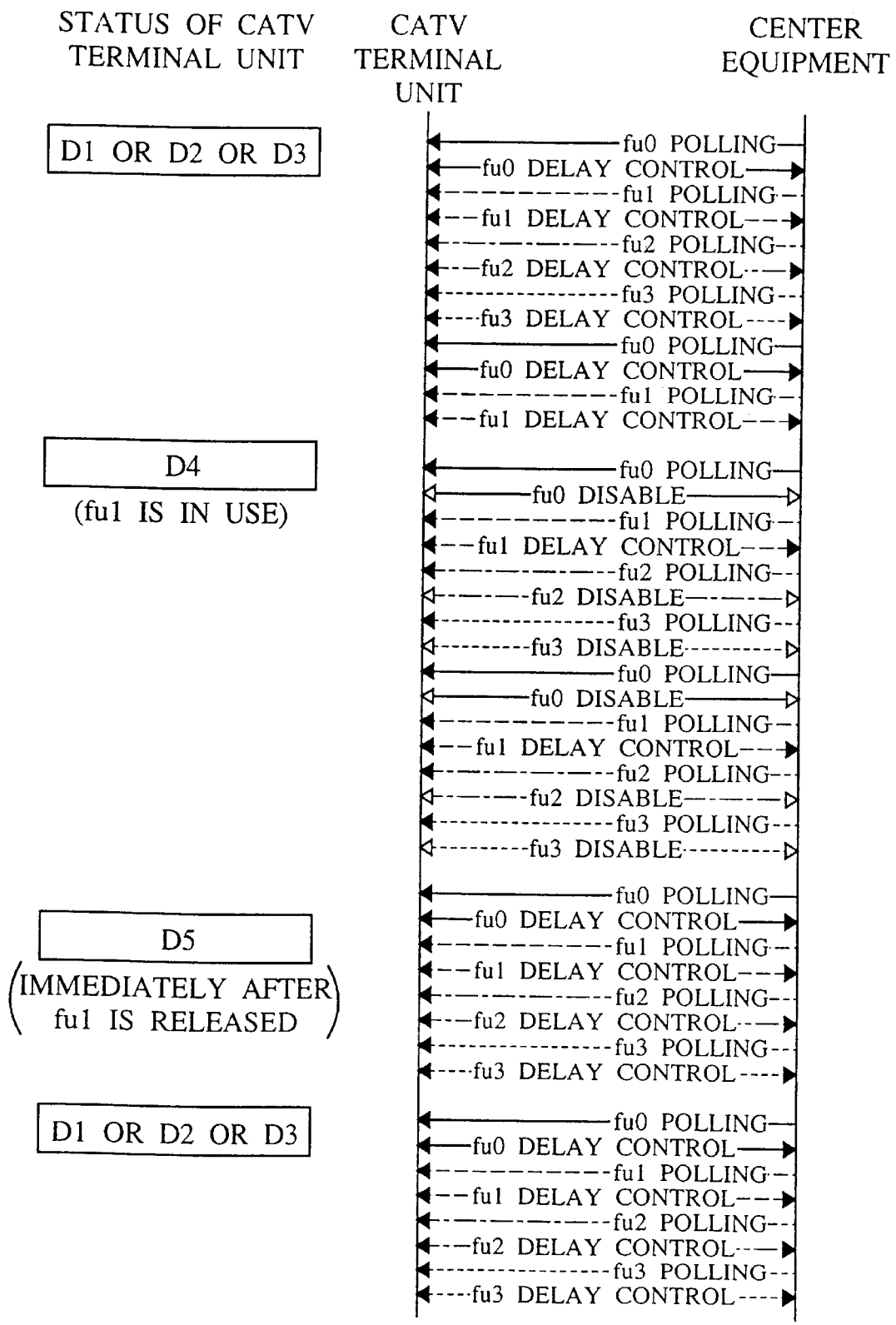

FIG.4

DOWN CONTROL CHANNEL

| CARRIER WAVE fd0 | Sy | DCd | Ad0 | Ad1 | Ad2 | Ad3 | Ad4 | Ad5 | Ad6 | Ad7 |

DOWN COMMUNICATION CHANNEL

| CARRIER WAVE fd1 | Sy | Dd10 | Dd11 | Dd12 | Dd13 | Dd14 | Dd15 | Dd16 | Dd17 | Dd18 | Dd19 | Dd1A |
|---|---|---|---|---|---|---|---|---|---|---|---|---|
| CARRIER WAVE fd2 | Sy | Dd20 | ⋯ | | | | | | | | | Dd2A |
| CARRIER WAVE fd3 | Sy | Dd30 | ⋯ | | | | | | | | | Dd3A |
| CARRIER WAVE fd4 | Sy | Dd40 | ⋯ | | | | | | | | | Dd4A |

UP CHANNEL

| CARRIER WAVE fu0 | DCu | Au0 | Au1 | Du00 | Du01 | Du02 | Du03 | Du04 | Du05 | Du06 | Du07 |
|---|---|---|---|---|---|---|---|---|---|---|---|
| CARRIER WAVE fu1 | DCu | Au2 | Au3 | Du10 | Du11 | ⋯ | | | | | Du17 |
| CARRIER WAVE fu2 | DCu | Au4 | Au5 | Du20 | Du21 | ⋯ | | | | | Du27 |
| CARRIER WAVE fu3 | DCu | Au6 | Au7 | Du30 | Du31 | ⋯ | | | | | Du37 |

Sy : FRAME SYNCHRONIZATION SLOT  
Ad,Au : ASSIGNMENT CONTROL CHANNEL SLOT  
DCd,DCu : DELAY CONTROL CHANNEL SLOT  
Dd,Du : COMMUNICATION DATA CHANNEL SLOT

CATV COMMUNICATION SYSTEM AND A CATV CENTER EQUIPMENT AND CATV TERMINAL UNITS

BACKGROUND OF THE INVENTION

1. Field of the Invention

The present invention relates to a CATV (cable television) communication system and a CATV center equipment and CATV terminal units and, more particularly, a CATV communication system for carrying out communication using a plurality of carrier waves in compliance with a time-division multiple access system and a CATV center equipment and CATV terminal units for embodying the same.

2. Description of the Prior Art

If communications are carried out via a CATV coaxial cable, various CATV services have to be electrically supplied through one connection line. Therefore, when many user terminals communicate simultaneously, a means for multiplexing plural channels within one connection line would be required. As one of such means, a time-division multiple access system (abbreviated as "TDMA system" hereinafter) has been utilized.

A CATV communication system comprises user terminals for providing desired service to users, a center equipment for executing control of digital signal transmitting channels in a CATV network, transmission of up communication data given by a service system, reception of down communication data given by the users, management of respective CATV terminal units and control of communication channels, a service system for providing various services via the CATV network as a service source, and CATV terminal units connected between the center equipment and the user terminal units. As shown in FIG. 12, the center equipment and respective CATV terminal units are connected via a distributor to set up a tree-like network.

Channel configurations in the first conventional CATV communication system using a TDMA system are shown in FIG. 1. In this conventional example, signals are transmitted via up channels and down channels using respective carrier waves with different frequencies. In other words, signals passing through up and down channels are modulated respectively by different carrier wave frequencies fu and fd. Both channels consist of many frames, i.e., information being time-divided at predetermined time intervals. Each frame is made up of a plurality of time slots, each slot being defined by partitioning the frame into further short time intervals.

There are three types of slots, i.e., delay control channel slot used for controlling delay time of each slot so as not to overlap arrival times of the signals which are sent from different user terminals to the center equipment, communication data channel slot used for transmitting user data, and assignment control channel slot used for controlling assignment of communication channels to respective user terminals.

Meanwhile, different distances of transmission cables from respective CATV terminal units to the center equipment yield different propagation delay times respectively. Hence, in order to prevent at the center equipment overlap of the signals which plural CATV terminal units sent out via different time slots, arrival timings of the signals at the center equipment must be arranged at corresponding locations allocated to respective slots by the delay control which may control transmission timings of respective CATV terminal units. For that purpose, the center equipment polls respective CATV terminal units to carry out the delay control via the delay control channel slot.

The delay control is carried out through the procedure shown in FIG. 13. First the center equipment selects a certain CATV terminal unit and sends out a delay control signal including delay control parameters to the CATV terminal unit. When receiving the delay control signal, the CATV terminal unit sets transmission delay time corresponding to the signal and then sends out an up delay control signal to the center equipment. In turn, the center equipment monitors arrival timing of the up delay control signal, and determines that, if arrival timing is within the specified range, the delay control has been established between the CATV terminal unit and the center equipment. Subsequently, the center equipment selects succeeding CATV terminal units sequentially to execute similar controls. Unless arrival timing is within the specified range, the center equipment sends out delay control data once again to continue the delay control.

When the delay control is established, the CATV communication system has been readied for establishment of communication channels between the center equipment and the CATV terminal units. To accommodate more users in the system by effectively utilizing the communication channels, a demand-assignment system may be employed in establishing the communication channels. More particularly, the demand-assignment system is defined as that only the CATV terminal unit starting the communication issues a request for assignment of channel to the center equipment to thus establish the communication channel between the center equipment and the CATV terminal unit, and the assigned communication channel is released after the communication is terminated.

An example of communication procedures according to the demand-assignment system will be explained hereinbelow. At first, the case where the user issues a request for service to the user terminal will be explained with reference to FIG. 14. (A) Information about idle channels are always broadcasted from the center equipment to the CATV terminal units. Under such condition, when the user requests the user terminal to provide the service, (B) the user terminal then issues a request for channel acquisition to the CATV terminal unit in response to the user's request. (C) The CATV terminal unit then searches an idle assignment control channel slot in the down communication channel, and then issues a request for assignment of communication data channel slot to the center equipment via a corresponding idle assignment control channel slot in the up communication channel. When receiving the request for assignment, (D) the center equipment lets the service system prepare for service, then assigns a communication data channel slot to the CATV terminal unit, and informs the CATV terminal unit of the assignment via the assignment control channel slot.

(E) The CATV terminal unit sets assigned communication data channel slot as available channel and transmits an assignment acknowledge signal to the center equipment. Responding to this signal, (F) the center equipment then requests the CATV terminal unit to turn on the user terminal. (G, H) The requested CATV terminal unit then turns on the concerned user terminal, (I) and sends out a turn-on acknowledge signal to the center equipment. With the above procedure, the channel has been established. Thereafter, the user terminal may communicate with the service system via the established channel, i.e., assigned channel slot, so that it may provide service delivered from the center equipment to the user.

On the other hand, in the event that service is generated by the center equipment, the channels are established according to procedures shown in FIG. 15. When the service is generated, the center equipment assigns the communication data channel slot to the CATV terminal unit, and then informs the CATV terminal unit of the assignment via the idle assignment control channel slot. Following to this, the channel may be established between the center equipment and the CATV terminal unit through the same procedures as used in the case where the user requests the service.

In order to prevent false frame synchronization in the down communication channel because of reluctant repetition of the pattern identical to the frame synchronization pattern on the channel, communication channel data is subjected to scrambling process in the CATV center equipment, and is then sent out as channel data. In the receiver side, the frame synchronization pattern is extracted from communication channel data. Then communication channel data is subjected to descrambling process.

In the meanwhile, in order to increase the number of subscriber who can be accommodated in the CATV communication system, transmission capability must be increased to attain a large capacity.

In the conventional example shown in FIG. 1, if data transmission rate is accelerated by broadening the frequency bandwidth used for carrier waves, data transmission capacity may be increased without any restriction in principle. However, as data transmission rate increases, symbols of the modulation signal and lengths of the slots are lessened to thus render the delay control difficult. Furthermore, such problems are arisen that high speed operation circuits are needed in the communication system and that waveform distortion occurs because of frequency dispersion in the transmission cable. Therefore, it is difficult in practice to utilize the signals with excessively broad bandwidth.

In the second conventional example explained hereinbelow, an FDM/TDMA system is utilized to accommodate more subscribers in the system, etc. wherein the CATV system employing the TDMA system explained in the foregoing conventional example is expanded up to a plurality of carrier waves. Channel configurations in the CATV communication system are shown in FIG. 2 wherein the TDMA system is applied to respective plural carrier waves (e.g., four carrier waves in this example) in an FDM (frequency division multiplex) system. In this system, a large number of users can be accommodated by dividing all the users into a plurality of groups and then allocating carrier waves to respective groups independently. The user may enjoy CATV services in the same manner as described in the above first conventional example, by using the carrier wave to which the user himself or herself is accommodated.

Basic procedures of the delay control in the FDM/TDMA system will be explained as follows. The delay control may be effected via respective delay control channels in the up and down communication control channels with respect to the up carrier wave to which each CATV terminal unit is assigned respectively. The CATV system is equipped with the first to n-th, i.e., N, CATV terminal units. The CATV terminal units from first to n/4-th are assigned to the carrier waves fu0 and fd0. In the same way, the units from n/4+1-th to 2n/4 to the carrier waves fu1 and fd1, the units from 2n/4+1-th to 3n/4 to the carrier waves fu2 and fd2, and the units from 3n/4+1-th to n to the carrier waves fu3 and fd3. Each CATV terminal unit always monitor the delay control channel slots. First, the center equipment executes delay control for the carrier wave fu0 to which the CATV terminal unit 1 is assigned thus establish the delay control between the center equipment and the CATV terminal unit 1. Likewise, the delay control is then executed to the CATV terminal unit 2 thus establish the delay control therebetween. In the similar manner, the delay control are thereafter repeated up to the CATV terminal unit n/4 which is the last one assigned to the carrier wave fu0 and fd0. Then, returning again to the CATV terminal unit 1, the delay control would be repeated cyclically after the delay control has been completed up to the CATV terminal unit n/4. In the same way, regarding the CATV terminal units which are assigned to other carrier waves, the delay control for the respective carrier waves is executed cyclically, so that the delay control can be established for all CATV terminal units.

Although descriptions of the prior art and the background of the invention have been given as above, following problems are caused in the FDM/TDMA system in the second conventional example. In particular, there is caused a problem that, under the condition that all communication channels employing a certain carrier wave are busy, i.e., being occupied, when the user who belongs to the group employing such carrier wave wishes to enjoy newly the CATV service, no channel can be assigned to the user since the carrier waves available for respective users are fixed. In addition, there is caused another problem that call loss occurs in such condition even if communication channels employing other carrier waves are idle.

It is evident that the problems in the second conventional example can be overcome if all the users may utilize any carrier wave. In the patent application Publication Laid-open (KOKAI) No. 63-272138, such system has been disclosed. However, in such system, there are several problems described in detail hereinbelow.

The case will be considered where all the users can utilize any carrier wave under the channel configurations in FIG. 2. In order to enable all the users to utilize any carrier wave, in the event that a request is issued from a certain terminal unit, states of respective assignment control channels are searched by synchronizing the carrier wave frequency with respective carrier waves sequentially and then; if at least one idle channel can be found, a request for assignment will be issued via the idle channel.

Basic procedures of the delay control in the FDM/TDMA system will be explained with reference to FIG. 16. The delay control may be effected via respective delay control channels in the up and down communication control channels corresponding to respective carrier waves. The CATV system is equipped with the first to n-th, i.e., N, CATV terminal units which always monitor the delay control channel slots. First, the center equipment executes delay control for the CATV terminal unit 1 from the carrier wave fu0 to the carrier wave fu3 in sequence to thus establish the delay control between the center equipment and the CATV terminal unit 1. Likewise, the delay control is then executed to the CATV terminal unit 2 from the carrier wave fu0 to the carrier wave fu3 in sequence to thus establish the delay control therebetween. In the similar manner, the delay control are thereafter repeated up to the CATV terminal unit n, so that the delay control can be established for all CATV terminal units. Then, returning again to the CATV terminal unit 1, the delay control would be repeated cyclically after the delay control has been completed up to the CATV terminal unit n thoroughly.

As shown in FIG. 17, the delay control may be effected to respective CATV terminal units by carrier wave such that polling is carried out for the CATV terminal units sequentially via a certain carrier wave, then the carrier wave is switched to another carrier wave, and then polling is carried out for the CATV terminal units sequentially.

FIG. 18 shows state transition in the delay control in respective CATV terminal units. In FIG. 18, D1 shows a state where delay control is not established at all, D2 shows a state where delay controls are established for part of carrier waves, D3 shows a state where delay controls are established throughout all carrier waves, D4 shows a communication state, and D5 shows a state immediately after communication is terminated.

A state of the CATV terminal unit to which the delay control cannot be established for part of carrier waves due to the trouble of the transmission line, for instance, transfers to D2. While a state of the CATV terminal unit to which the delay control is established throughout all carrier waves advances to D3.

In the meanwhile, even if the delay control is carried out according to either way shown in FIG. 16 or FIG. 17, basically such delay control must always be repeated for all carrier waves. However, in the event that only one carrier wave can be demodulated by the CATV terminal unit, the delay control can be done only for the carrier wave in use in a D4 state, i.e., a communication state. FIG. 3 is a chart illustrating an example in such event. In the case in FIG. 3, since the carrier wave fu1 is in use in a communication state, the delay control cannot be established for other carrier waves although they are polled.

But a problem is caused in this method that it often takes a plenty of time to search the idle channels. The reason for this problem will be given as follows. If the assignment control channel employing the first searched carrier wave is busy, the assignment control channel having the succeeding carrier wave is checked whether it is idle or not and, unless the channel is idle, the further assignment control channel is checked, and so on. Such procedures have to be repeated until the idle assignment control channel can be found. However, since carrier and frame synchronization must be established for respective carrier waves to check status of the channels, such synchronization has to be tried for many carrier waves to find the idle assignment control channel under the condition that most of the channels are busy. Therefore, according to this method, there are such problems that user's convenience is degraded, and sometimes the channel cannot be established until a time assigned for the user's apparatus expires, and also it takes plenty of time to receive the service from the service system. In addition, there is another problem that procedures necessary to the delay control become complicated.

In the prior art, even if the carrier wave is in communication, delay controls are tried for the remaining carrier waves for which the delay control cannot be established, as shown in FIG. 3, and therefore there is caused a further problem that unnecessary and wasteful procedures have been taken.

While, after the communication has been terminated (status D5 in FIG. 18), the delay control has been established for the carrier wave being used in communication up to now. Therefore, the delay control for the carrier wave being used may be neglected immediately after the communication has been terminated, whereas the delay control for the remaining carrier waves must be established quickly since no delay control has been established for the remaining carrier waves. However, if the delay control is implemented by selecting the carrier waves in predetermined order as described above, polling processes have been executed irrespective of establishment/unestablishment of the delay control. Hence, in some cases, the carrier waves for which the delay control has not been established may be put off.

SUMMARY OF THE INVENTION

The present invention has been made in view of the above problems, and it is an object of the present invention to provide a CATV communication system capable of accommodating a plenty of users therein and assigning communication channels to respective users promptly even if a channel utilization factor is in a high state, and a CATV center equipment and CATV terminal units for embodying the same.

It is another object of the present invention to provide a CATV communication system capable of implementing effective delay control, and a CATV center equipment and CATV terminal units for embodying the same.

In order to achieve the above objects of the present invention, according to an aspect of the present invention, there is provided a CATV communication system wherein channel slots are composed in compliance with a frequency division multiplex system and a time division multiple access system in combination, and communication channels are established between a CATV center equipment and plural CATV terminal units in accordance with a demand-assignment system to communicate therebetween, wherein the CATV center equipment comprises a down control channel having a carrier wave different from those in a plurality of down communication channels and including information which indicates either channel of a plurality of up channels is available, the CATV terminal unit which has received a communication request issues a request for assignment of channel slot to the CATV center equipment via the up channel being available, and the CATV center equipment assigns a channel slot available for communication out of all channel slots constituting a plurality of up communication channels to the CATV terminal unit in response to the request for assignment of channel slot.

According to the present invention, the CATV terminal unit can know quickly an idle up channel and can communicate with the center equipment via the idle up channel.

In the preferred embodiment of the present invention, signals passing through the down communication channel are subjected to scrambling process in the CATV center equipment and are subjected to descrambling process in the CATV terminal unit.

According to this embodiment, the false frame synchronization can be prevented.

In the preferred embodiment of the present invention, the down control channel and the down communication channel use respective frames which are synchronized with each other to have a certain timing relationship.

According to this embodiment, since the frame synchronization timing for the down communication channel can be established in compliance with the frame synchronization timing for the down control channel, the frame synchronization can be established more quickly.

In the preferred embodiment of the present invention, signals transmitted through the down communication channel are neither subjected to scramble process in the CATV center equipment, nor subjected to descramble process in the CATV terminal unit.

In the preferred embodiment of the present invention, the CATV center equipment transmits information specifying the CATV terminal unit which is to be subjected to delay control and the up channel which is to be subjected to delay control out of a plurality of up channels by including in the down control channel, and the CATV center equipment and the CATV terminal unit specified by the information execute delay control to the up channel being specified.

According to this embodiment, since, in the frequency division multiplex system, only the carrier wave for which the delay control is needed is subjected to the delay control, effective delay control can be implemented.

According to another aspect of the present invention, there is provided a CATV center equipment comprising: down communication channel transmitting means for multiplexing plural down communication data sent out from a service system, modulating multiplexed data by a carrier wave assigned to one channel out of a plurality of down communication channels, and outputting modulated data; down control channel transmitting means for multiplexing down control data including down assignment control data and/or down delay control data, modulating multiplexed data by a carrier wave different from the carrier waves assigned to the plurality of down communication channels, and outputting modulated data; up channel receiving means for demodulating an up channel modulation signal, separating a demodulated signal into up assignment control data and/or up delay control data and/or up communication data, and outputting such data; delay/assignment controlling means for receiving the up assignment control data and/or the up delay control data, and outputting the down control data to the down control channel transmitting means; and timing generating means for providing an operation timing signal to the down communication channel transmitting means, the down control channel transmitting means, and the up channel receiving means.

In the preferred embodiment of the present invention, the CATV center equipment further comprises scrambling means for scrambling plurality of down communication data sent out from the service system.

In the preferred embodiment of the present invention, the timing generating means provides respective operation timings which are synchronized with each other to have a certain timing relationship to the down communication channel transmitting means and the down control channel transmitting means.

According to still another aspect of the present invention, there is provided a CATV terminal unit comprising: down communication channel receiving means for demodulating at least one of a plurality of down communication channels, extracting a requested communication channel, and outputting it as down communication data; down control channel receiving means for demodulating down control channel, extracting down assignment control data and/or down delay control data, and outputting such data; up channel transmitting means for multiplexing down communication data and/or up assignment control data and/or up delay control data sent out from a user terminal unit, modulating multiplexed data by a carrier wave assigned to one channel of the plurality of up channels, and outputting modulated data; and terminal controlling means for receiving the down assignment control data and/or the down delay control data, and outputting the up control data to the up channel transmitting means.

In the preferred embodiment of the present invention, the CATV terminal unit further comprises descrambling means for descrambling down communication data which are output from the down communication channel receiving means.

In the preferred embodiment of the present invention, the down control channel receiving means outputs a frame synchronization timing auxiliary signal which are synchronized with a frame synchronization timing signal for the down control channels to have a certain timing relationship, and the down communication channel receiving means establishes frame synchronization for the communication channel based on the frame synchronization timing auxiliary signal.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is a schematic view showing an example of channel configurations of a conventional CATV communication system;

FIG. 2 is a schematic view showing another example of channel configurations of the conventional CATV communication system;

FIG. 3 is a chart illustrative of delay control process in the conventional CATV communication system;

FIG. 4 is a schematic view showing channel configurations of a CATV communication system according to an embodiment of the present invention;

DESCRIPTION OF THE PREFERRED EMBODIMENTS

Preferred embodiments of the present invention will be explained in detail hereinafter with reference to accompanying drawings.

FIG. 4 is a schematic view showing channel configurations of a CATV communication system according to a first embodiment of the present invention. As shown in FIG. 4, channels in the present invention comprises a down control channel, down communication channels, and up channels.

In more detail, the down control channel uses one carrier wave fu0 serving as the down control carrier wave, and accommodates a down delay control channel slot DCd and a plurality of assignment control channel slots Ad0 to Ad7 therein. The down communication channels use a plurality of carrier waves fd1 to fd4 serving as down communication carrier waves respectively, the frequencies of which being different from that of the carrier wave fd0, and accommodate communication channel slots Dd10 to Dd1A, Dd20 to Dd2A, Dd30 to Dd3A, and Dd40 to Dd4A respectively. Here A denotes 10 in decimal notation.

Up channels use a plurality of carrier waves fu0 to fu3, and accommodate an up delay control channel slot DCu, assignment control channel slots Au0 to Au7, and communication channel slots Du00 to Du07, Du10 to Du17, Du20 to Du27, and Du30 to Du37. A frame synchronization slots Sy is positioned at the heads of the down control channel and the down communication channels to generate a frame synchronization timing. In the up channels, the control channel and the communication channels are not discriminated from each other at each carrier wave. A delay control channel slot DCu, two assignment control channel slots Au(2i) and Au(2i+1), and eight communication channel slots Dui0 to Dui7 are accommodated in one frame of one carrier wave (where the number of carrier wave is set as i).

Figure 5:
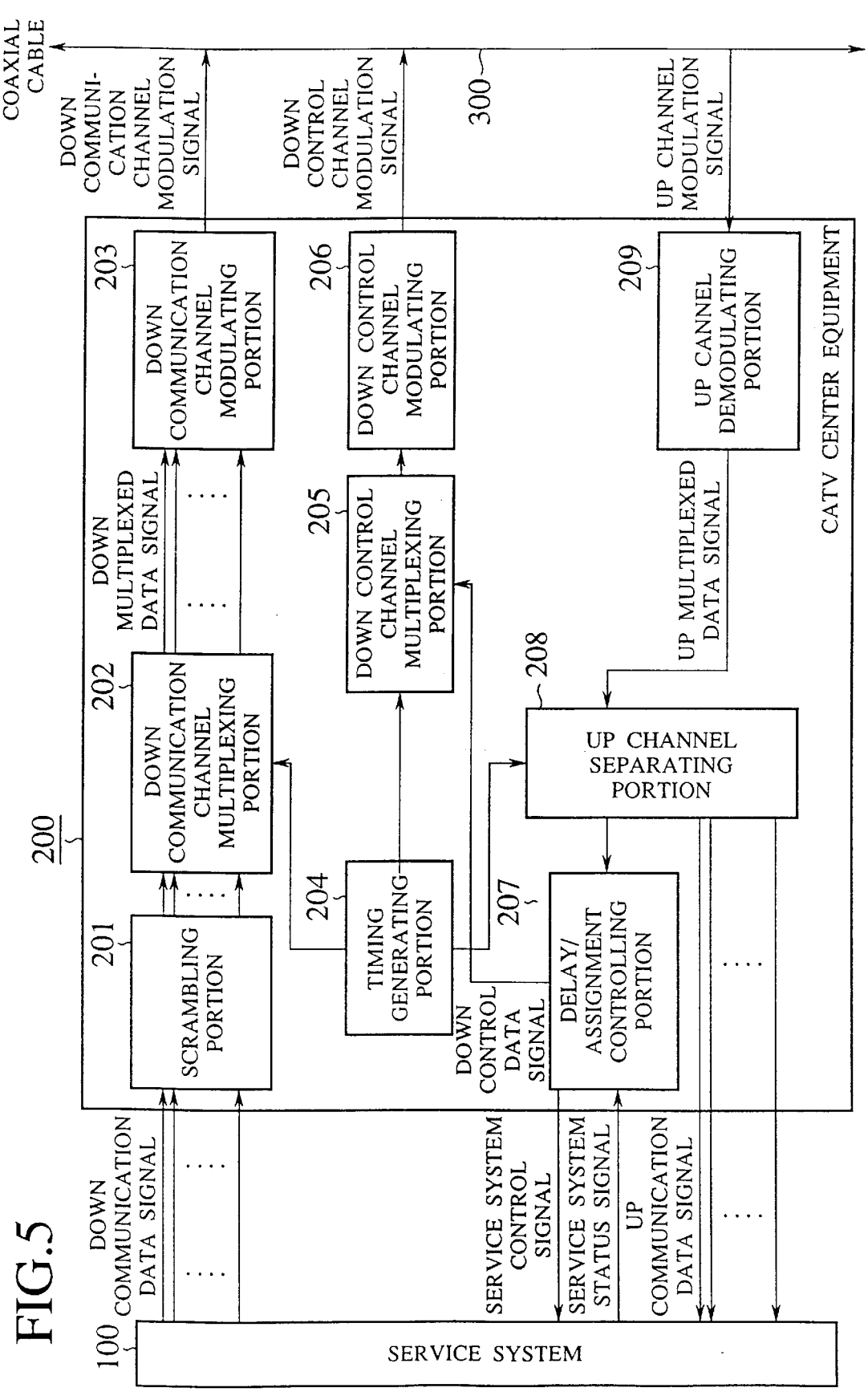
FIG. 5 is a block diagram showing a configuration of a first embodiment of a CATV center equipment according to the present invention.

FIG. 5 is a block diagram showing a configuration of a first embodiment of a CATV center equipment according to the present invention. In FIG. 5, down communication data delivered from a service system 100 is scrambled by a scrambling portion 201, then multiplexed by a down communication channel multiplexing portion 202, and then modulated by a down communication modulating portion 203 to be transmitted to a not shown CATV terminal unit 400 via a coaxial cable network 300. Conversely, the up channel modulation signal is demodulated by an up channel demodulating portion 209, and separated by an up channel separating portion 208 to then be sent out to the service system 100 as up communication data.

Furthermore, delay control channels and assignment control channels are separated by an up channel separating portion 208, and then the delay control signals and assignment control signals are input to a delay/assignment controlling portion 207. Down control data as an output of the delay/assignment controlling portion 207 is multiplexed by a down control channel multiplexing portion 205, then modulated by a down control channel modulating portion 206 to thus be transmitted to a CATV terminal unit 400 via the coaxial cable 300. A timing generating portion 204 provides an operation timing to respective portions. The down communication channel multiplexing portion 202 and the down control channel multiplexing portion 205 multiplexes frame synchronization slot patterns. The delay/assignment controlling portion 207 sends out down control data signals for controlling the down communication channel multiplexing portion 202, the down control channel multiplexing portion 205, and the up channel separating portion 208 (not shown in part).

Figure 6:
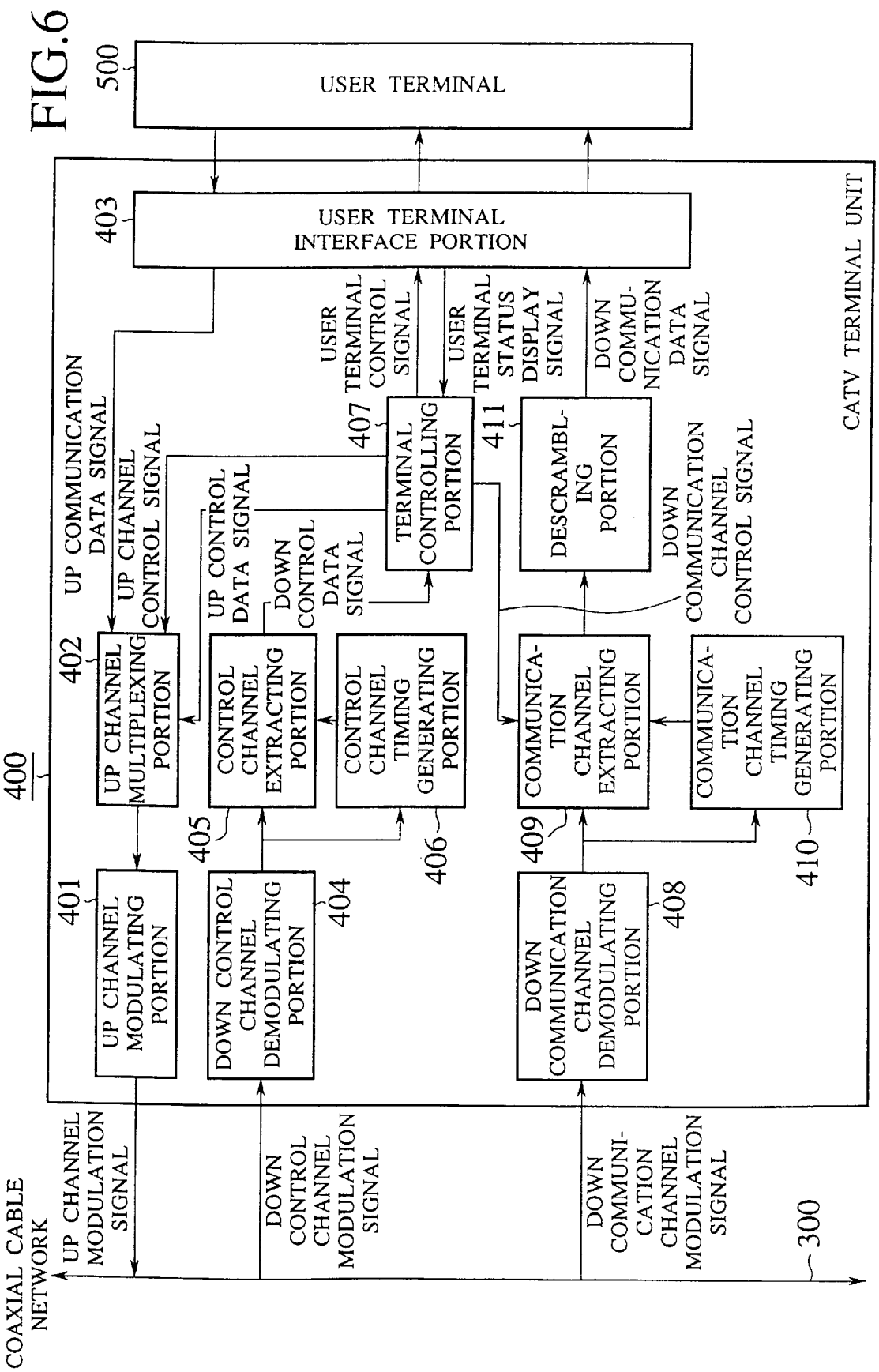
FIG. 6 is a block diagram showing a configuration of a first embodiment of a CATV terminal unit according to the present invention.

FIG. 6 is a block diagram showing a configuration of a first embodiment of a CATV terminal unit according to the present invention. In FIG. 6, the down communication channel modulation signal is demodulated by a down communication channel demodulating portion 408. Down communication channel data are separated and extracted from the demodulated signal by a communication channel extracting portion 409, and then the down communication channel data are descrambled by a descrambling portion 411. The descrambled signal is sent out as the down communication data signal to a user terminal 500 via a user terminal interface portion 403.

On the contrary, up communication data signals which are sent out from a user terminal 500 via the user terminal interface portion 403 are supplied through an up channel multiplexing portion 402, then modulated by an up channel modulating portion 401 with including a transmission time slot period, and then output. The down control channel modulating signal is demodulated by a down control channel demodulating portion 404. Down control data signals are separated and extracted from the demodulated signals by a control channel extracting portion 405, and then received by a terminal controlling portion 407. The terminal controlling portion 407 sends out up control data signals to the up channel multiplexing portion 402, the communication channel extracting portion 409, the down communication channel demodulating portion 408, the up channel modulating portion 401 and the user terminal interface portion 403 based on the down control data signal (not shown in part).

In addition, the up control data signals output from the terminal controlling portion 407 are supplied via the up channel multiplexing portion 402, then modulated by the up channel modulating portion 401 with including a transmission time slot period, and then output to the coaxial cable 300. A communication channel timing generating portion 410 generates a frame synchronization timing signal for the communication channel from the synchronization pattern in the frame synchronization slot of the communication channel. A control channel timing generating portion 406 generates a frame synchronization timing signal for the control channel from the synchronization pattern in the frame synchronization slot of the control channel. Respective timing signals are used to separate and extract the channels. The user terminal interface portion 403 generates a control signal pattern within a bandwidth of the communication data signal, i.e., by virtue of in-band signaling, based on instruction of terminal control signal supplied from the terminal controlling portion 407 and then outputs the pattern. The user terminal interface portion 403 also sends out a user terminal status display signal informing the terminal controlling portion 407 of the status of the user terminal based on a status display signal supplied from the user terminal 500 within the bandwidth of the communication data signal.

Figure 14:
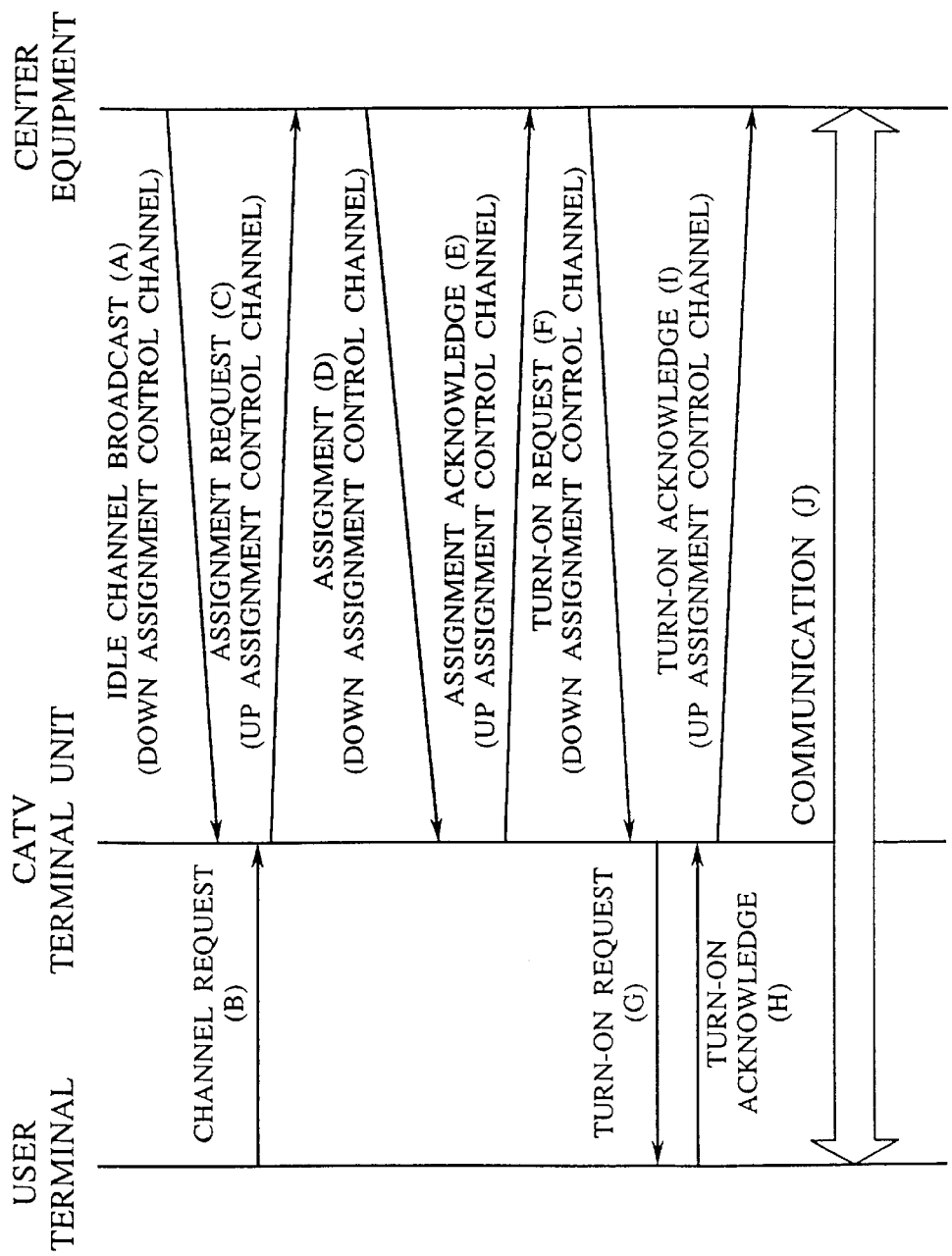
FIG. 14 is a transition diagram illustrative of sequences for establishing a communication channel for the CATV terminal units (when the user issues a request for service)
Figure 15:
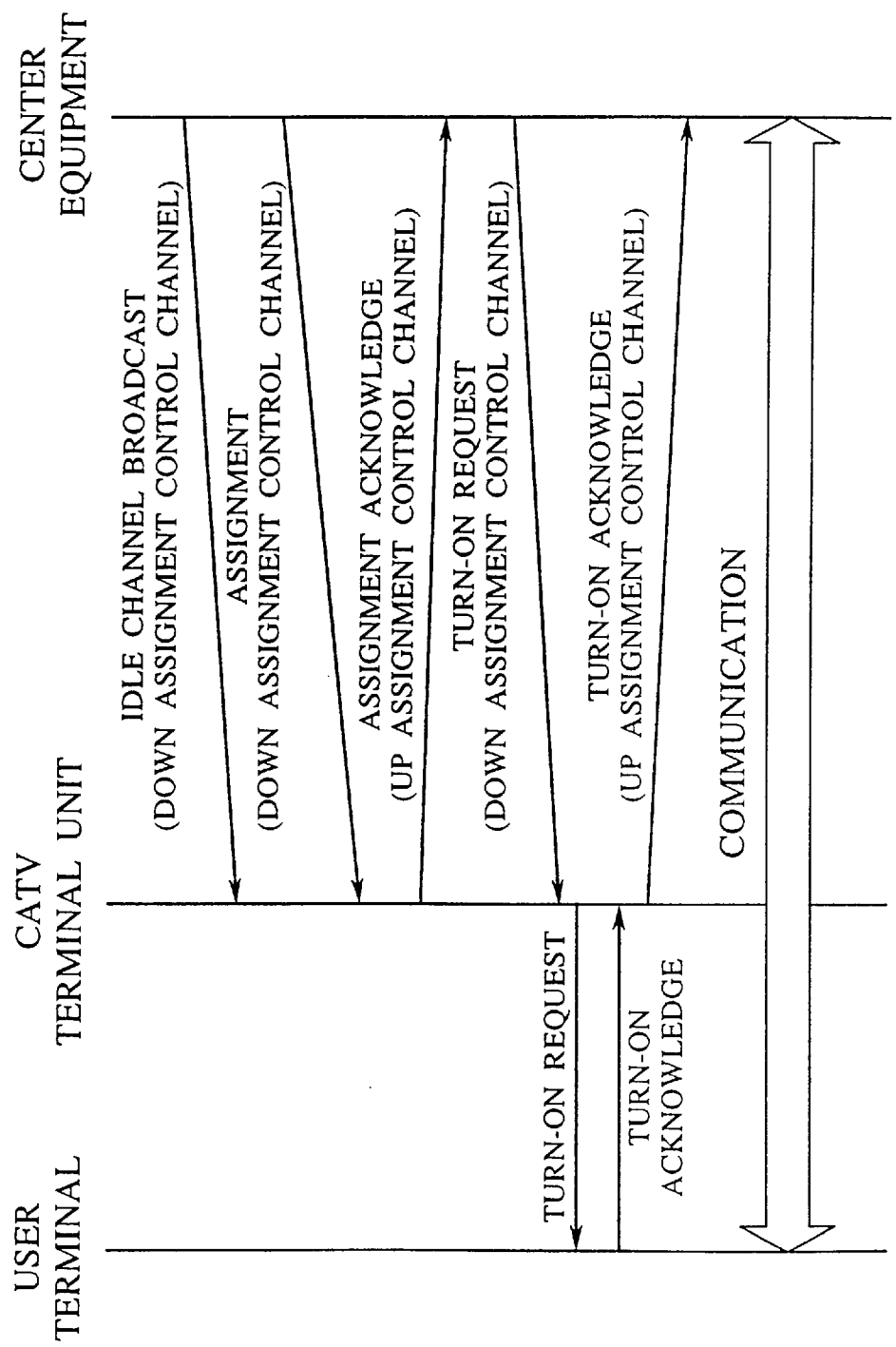
FIG. 15 is a transition diagram illustrative of sequences for establishing a communication channel for the CATV terminal units (when the CATV center equipment generates service)
Figure 16:
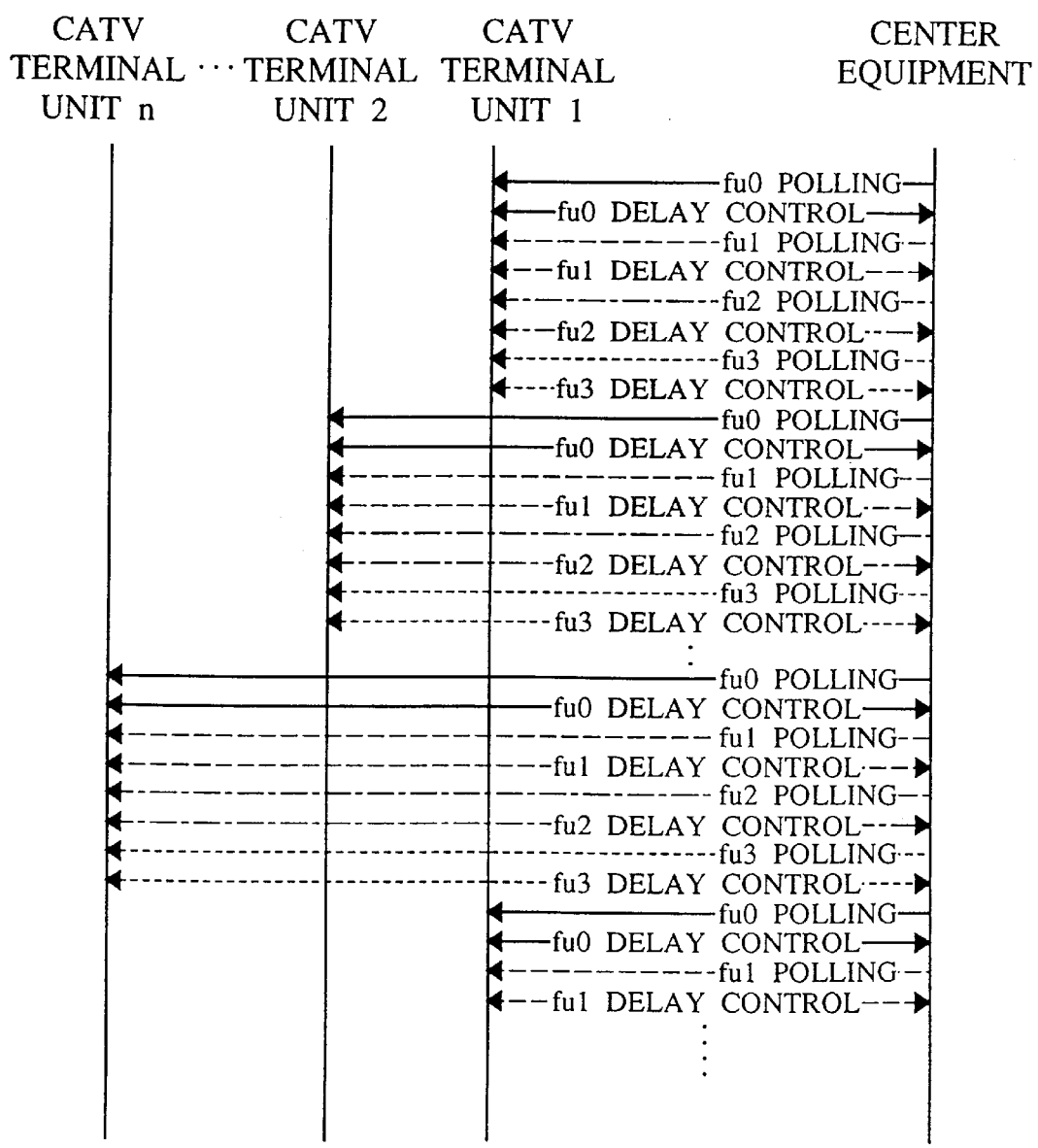
FIG. 16 is a chart illustrative of one way of delay control process in FDM scheme.
Figure 17:
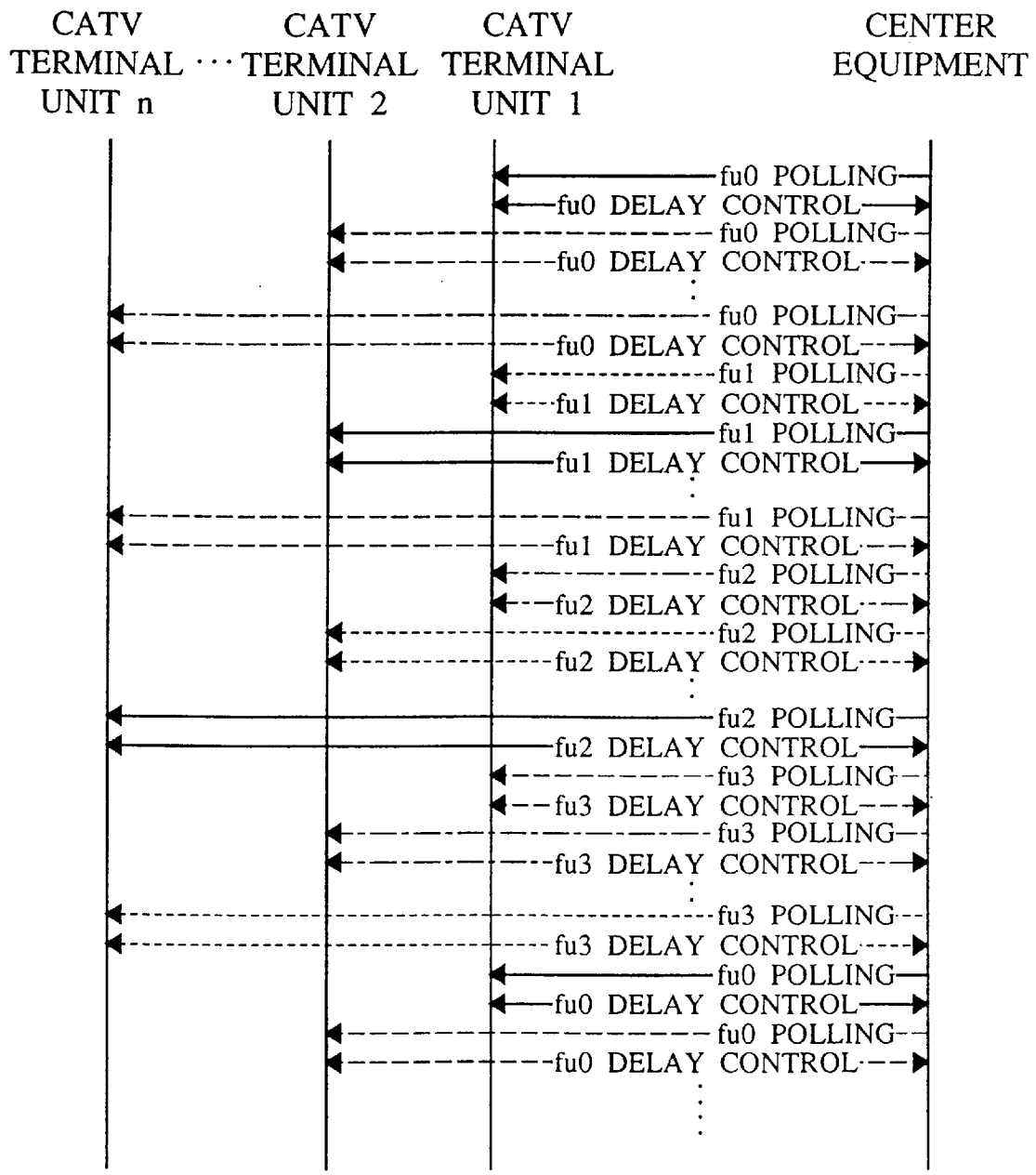
FIG. 17 is a chart illustrative of another way of delay control process in FDM scheme.

Next, assignment procedure of channel in the CATV communication system of the present invention will be explained with reference to FIG. 14 in the event that the user requests the user terminal to provide the service.

(A) Information about idle channels are always broadcasted over the down control channel from the center equipment to the CATV terminal units. Under such a condition, when the user requests the user terminal to provide the service, (B) the user terminal then issues a request for channel acquisition to the CATV terminal unit in response to the request. (C) The CATV terminal unit then searches an idle assignment control channel slot in the down control channel supplied over the carrier wave fd0, and then issues a request for assignment of communication data channel slot to the center equipment via the idle assignment control channel slot in the up channel. When the center equipment receives the request for assignment, it causes the service system to start the service, then assigns an idle down communication data channel slot out of channels of all carrier waves to the CATV terminal unit, (D) and informs the CATV terminal unit of a slot assignment message via the idle down assignment control channel slot.

(E) The CATV terminal unit sets assigned communication data channel slot and frequency as available channel and frequency, and transmits a slot assignment acknowledge message to the center equipment. In response to this message, (F) the center equipment then requests the CATV terminal unit to turn on the channel between the CATV terminal and the user terminal. According to the request, (turn-on request (G), turn-on acknowledge (H)), the CATV terminal unit then turns on the concerned user terminal, (I) and sends out a turn-on acknowledge message to the center equipment. Subsequently, (J) service is provided from the user terminal to the user via the established channel, i.e., assigned communication data channel slot.

According to the present embodiment, since respective user terminals may use the channel with any carrier wave, the channel can be assigned if the idle communication data channel slot can be found in at least one carrier wave in assigning the idle communication data channel slot. As a result, time slot may be used effectively. Further, since delay control channel slots and assignment control channel slots can always be monitored, the CATV system may respond quickly to assignment request, assignment reception, and delay control.

In the above present embodiment, it is assumed that the number of carrier wave in the down communication channel is identical to that in the up communication channel. However, in the present invention, the carrier waves in the down communication channel and the up communication channel need not be set to the same number and the same bandwidth, and also both communication channels need not have the same transmission speed. These are matters of choice in system design.

In turn, delay control in the CATV communication system of the present invention will be explained.

Figure 10:
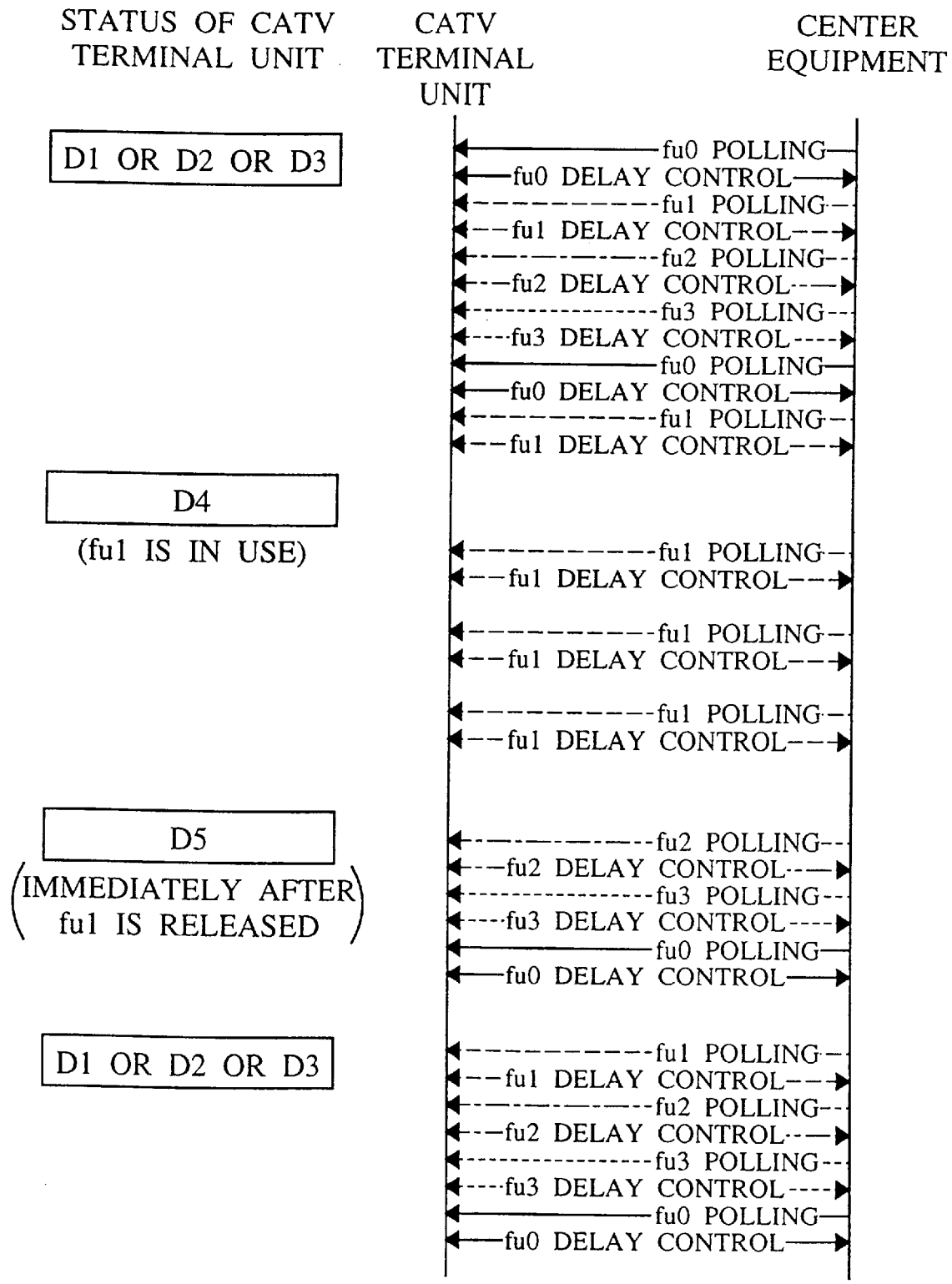
FIG. 10 is a chart illustrative of an example of procedures for establishing delay control according to the present invention.

FIG. 10 is a chart illustrative of an example of procedures for establishing delay control according to the present invention. If the CATV terminal unit is in a state D1 or D2, the center equipment polls the CATV terminal unit from carrier wave fu0 to carrier wave fu3 in sequence to implement delay control. Polling for delay control is carried out in such a manner that the center equipment broadcasts information such as the number of the CATV terminal unit, frequency of the carrier wave, and delay amount via the delay control channel slots in the down control channel. The CATV terminal unit transfers to the status D3 if the delay controls have been established throughout all carrier waves while the CATV terminal unit transfers to the status D1 if it fails to establish the, delay control. If the delay controls are established for part of the carrier waves, the CATV terminal unit transfers to the status D2. When the communication is commenced between the CATV terminal unit and the center equipment in the status D3, the CATV terminal unit transfers to the status D4. At this time, if the carrier wave fu1 is being used in communication, the center equipment polls only the carrier wave fu1 to establish the delay control. In the present invention, such control may be enabled since the down control channel is provided independently. In the event that the CATV terminal unit fails in the delay control, it transfers to the status D1.

Then the communication is completed, the CATV terminal unit transfers to the status D5. Since polling of the carrier wave fu1 has already been terminated in the status D5, the center equipment polls delay control slots other than the slot using the carrier wave fu1 to implement the delay control. The CATV terminal unit transfers to the status D2 if the delay controls are successful in part of the carrier waves, and the CATV terminal unit transfers to the status D3 if the delay controls are successful in all the carrier waves. The CATV terminal unit transfers to the status D1 if the delay controls are not established throughout any carrier wave.

According to this delay control method, first, useless polling can be prevented after the communication is commenced. Second, since the delay controls for the carrier waves to which delay controls have not established yet are implemented preferentially after the communication is terminated, the delay control can be established more quickly.

Figure 11:
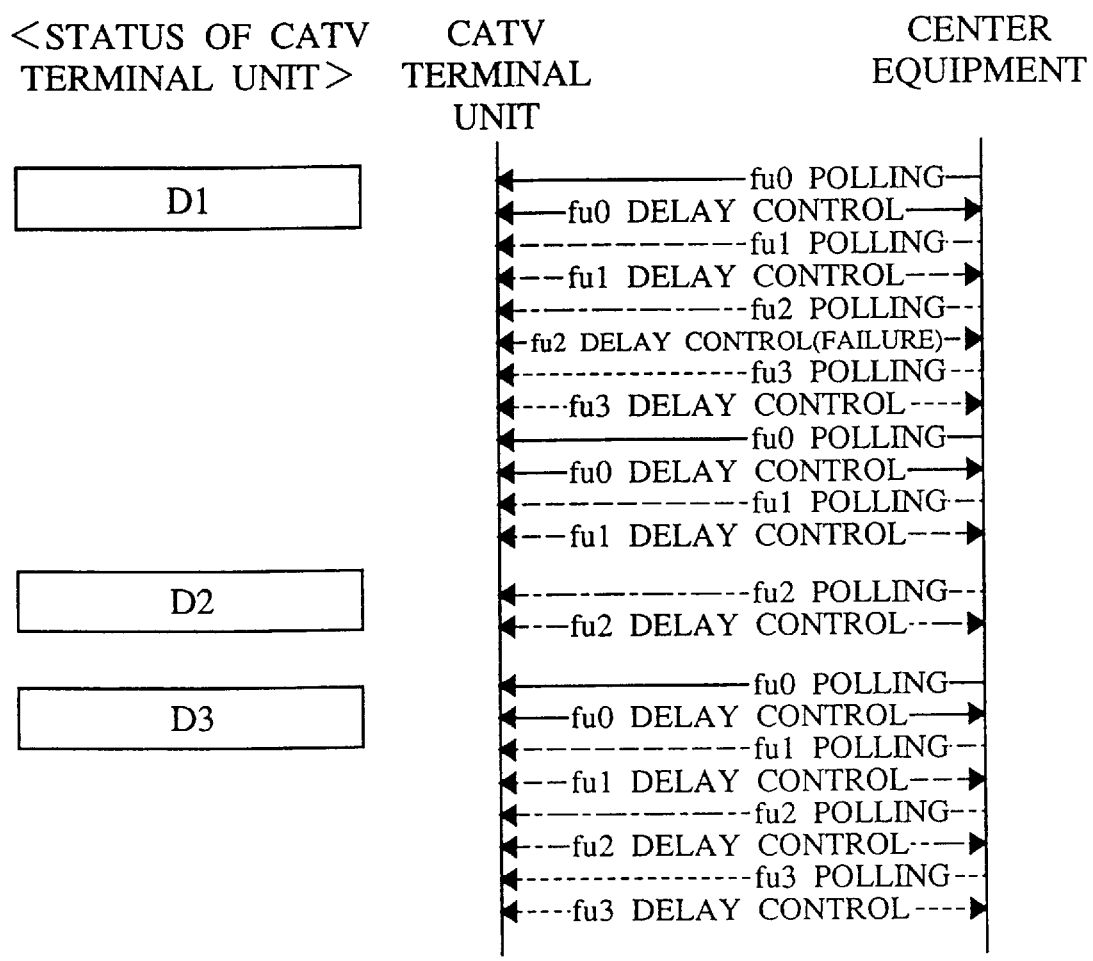
FIG. 11 is a chart illustrative of another example of procedures for establishing delay control according to the present invention.
Figure 12:
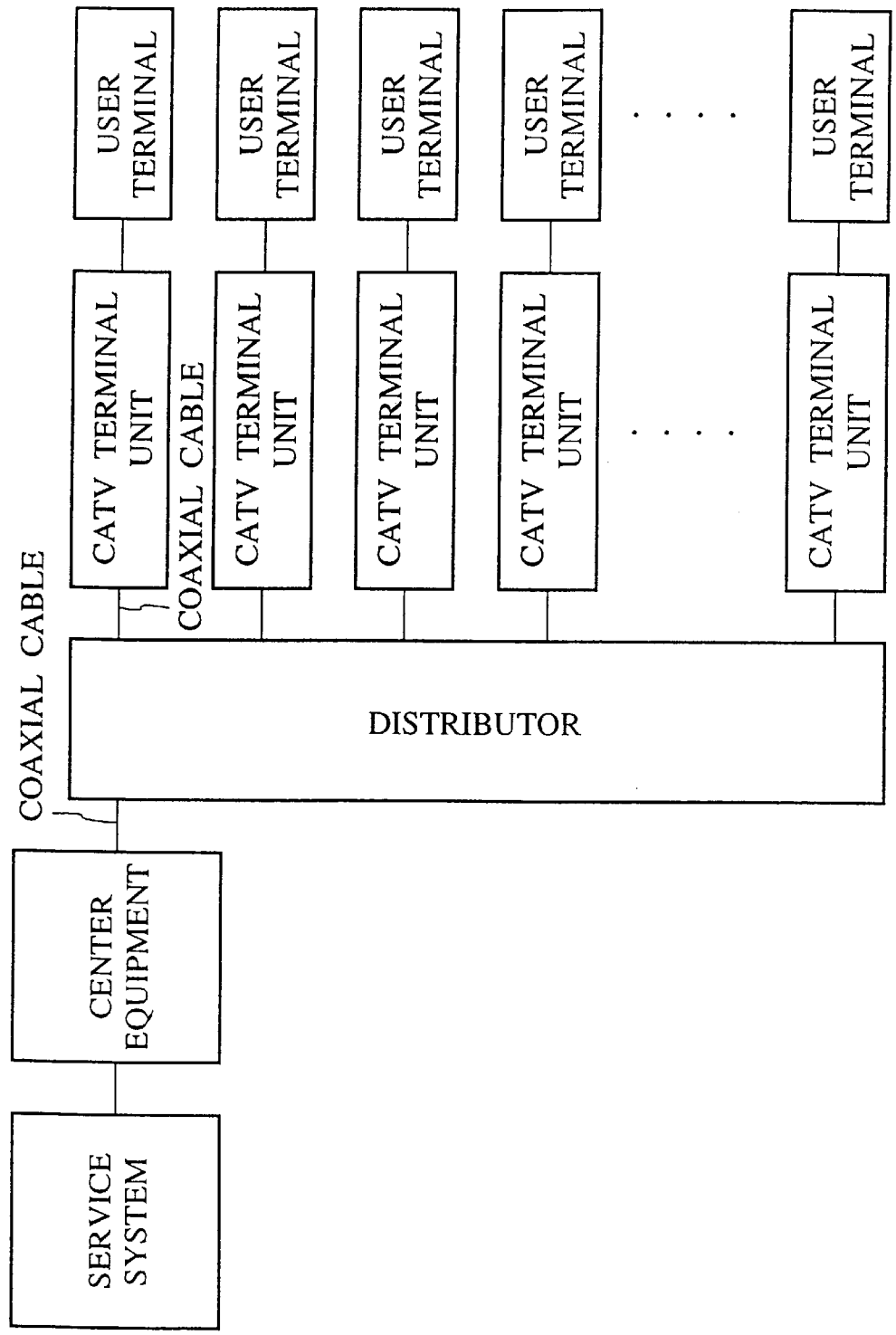
FIG. 12 is a schematic block diagram showing an overall configuration of a CATV system.
Figure 13:
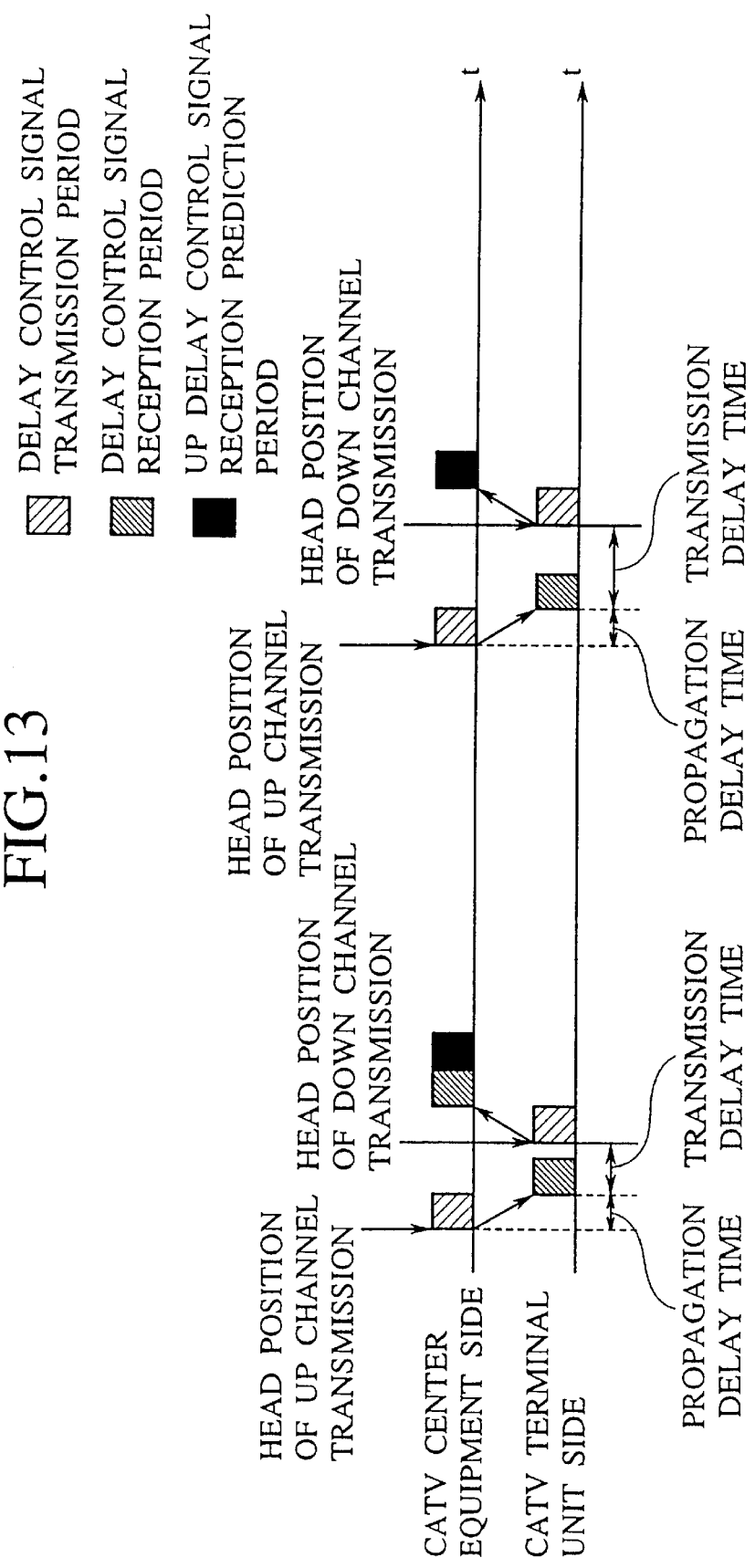
FIG. 13 is a graphical representation explaining communications handled between the CATV center equipment and the CATV terminal units in delay control.
Figure 18:
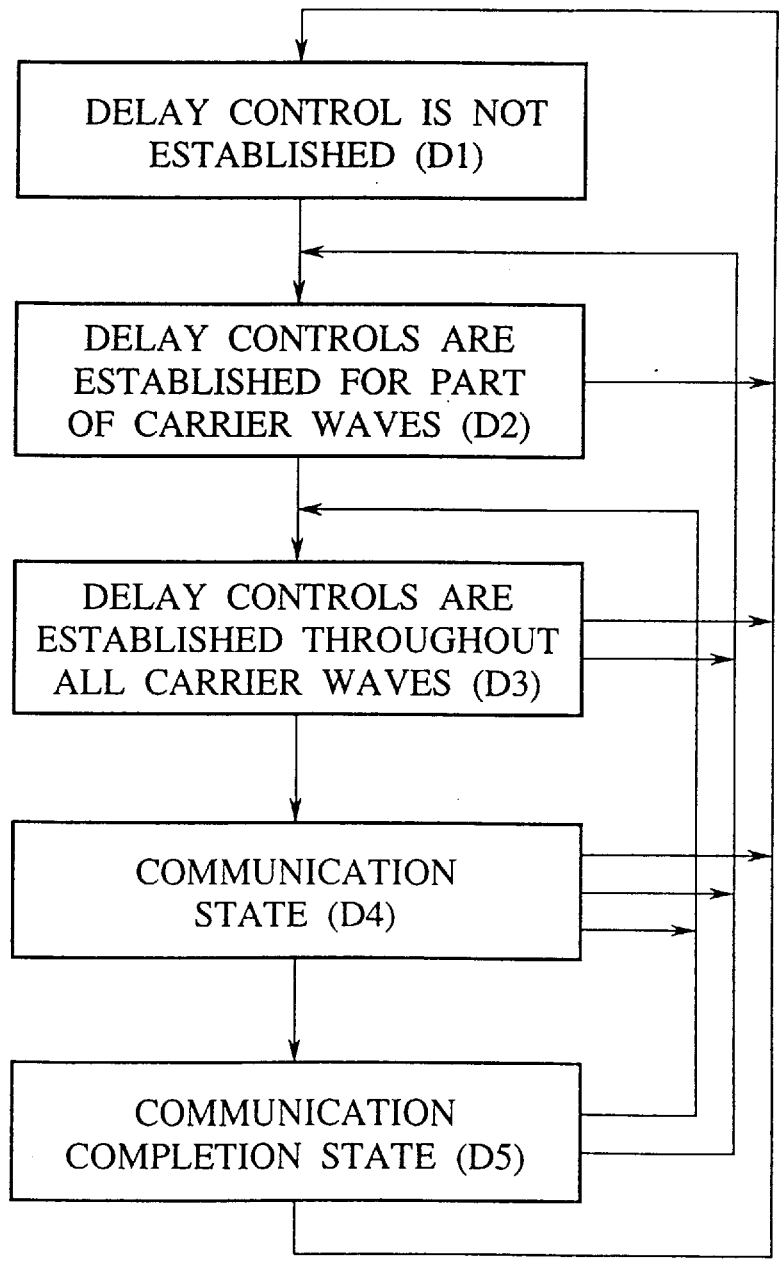
FIG. 18 is a schematic block diagram showing status transition in delay control process.

Though in the status D2 shown in FIG. 18 the delay controls have not established because of any cause such as temporarily failure of the channel, the delay control must be established quickly for such channels. Therefore, in the delay control of the present invention, the carrier waves to which the delay controls are not established in the status D2 are polled preferentially, thereby trying establishment of the delay control quickly. Such procedures are shown in FIG. 11.

Next, a second embodiment of the CATV communication system and the CATV center equipment and the CATV terminal units of the present invention will be explained. A configuration of the CATV center equipment according to the second embodiment is substantially identical to that in the first embodiment, but it is characterized in that the timing generating portion 204 in FIG. 5 provides the same timing as a timing signal supplied to the down communication channel multiplexing portion 202 and the down control channel multiplexing portion 205.

Figure 7:
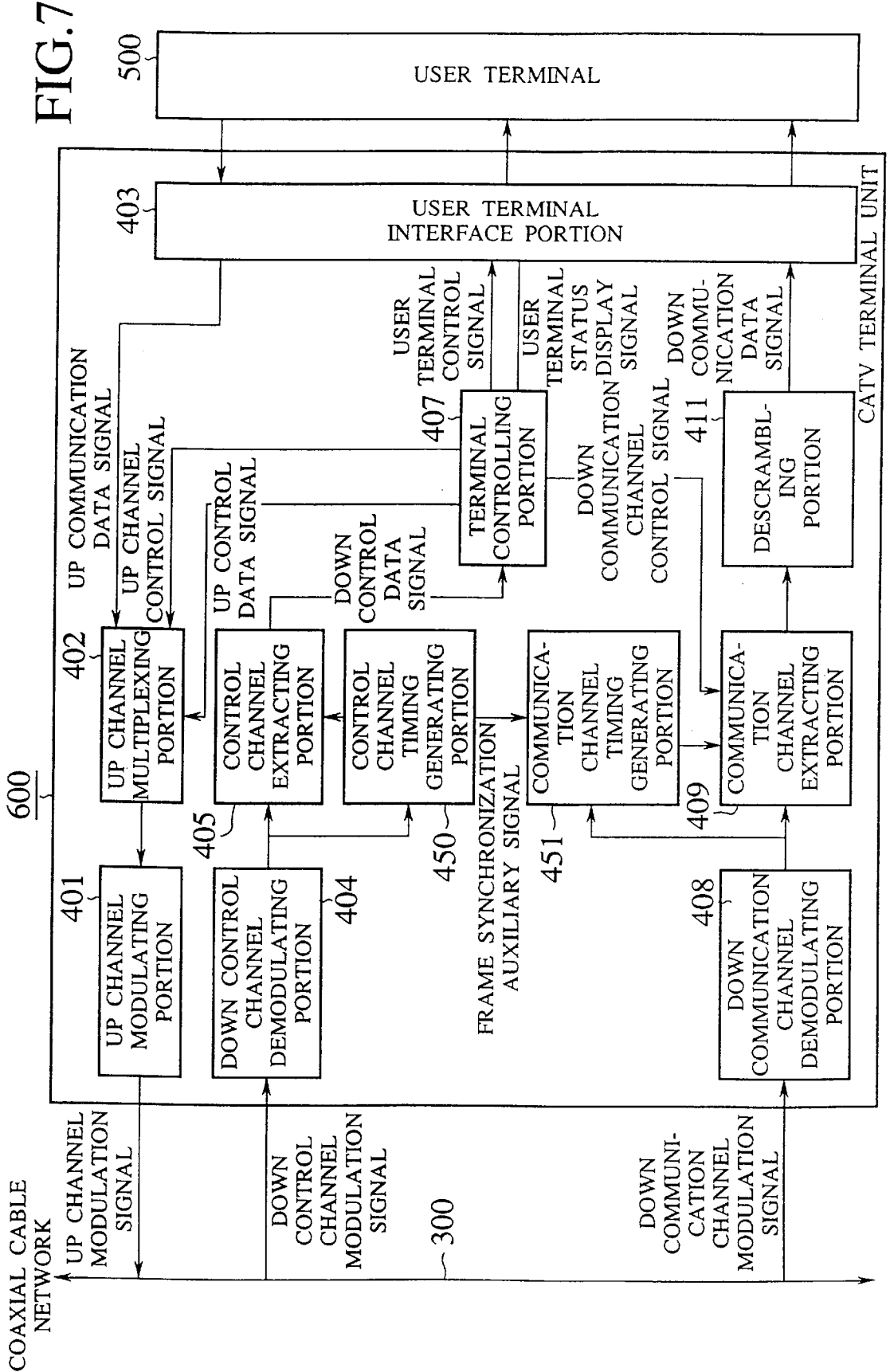
FIG. 7 is a block diagram showing a configuration of a second embodiment of a CATV terminal unit according to the present invention.

FIG. 7 is a block diagram showing a configuration of the CATV terminal unit according to the second embodiment of the present invention. In FIG. 7, in place of the communication timing generating portion 410 shown in FIG. 6, a communication channel timing generating portion 451 is provided which receives a frame synchronization auxiliary signal from the control channel timing generating portion 450. This signal is a signal for supporting generation of the frame synchronization timing for the communication channel, and is generated based on the frame synchronization timing for the control channel. In the second embodiment, it is assumed that timing provided to the frame synchronization auxiliary signal for the communication channel is synchronized with the frame synchronization timing for the control channel.

In the second embodiment, since the same timing can be supplied to the down communication channel and the down control channel from the CATV center equipment, the frame synchronization timing for the down communication channel is substantially identical to that for the down control channel in the CATV terminal unit. For this reason, the communication channel timing generating portion 451 can anticipate the frame synchronization timing for the down communication channel by monitoring the frame synchronization auxiliary signal supplied from the control channel timing generating portion 450. Hence, it is feasible to establish the frame synchronization by detecting frame synchronization pattern for the down communication channel near the synchronization timing on the basis of the frame synchronization auxiliary signal. Consequently, the frame synchronization for the communication channel can be established quickly.

In the second embodiment, the same timing has been applied to frame synchronization for the down control channel and the down communication channel. However, the same timing is not always required and, if the timing of the frame synchronization for the communication channel can be generated based on the frame synchronization timing for the control channel, a certain timing relation between both frame synchronization may be utilized. Likewise, timing information included in the frame synchronization auxiliary signal is not always synchronized with the frame synchronization timing for the control channel.

As stated above, if the timing relation described in the second embodiment is given to the frame synchronization timings between the down control channel and the down communication channel, the frame synchronization can be established without applying scrambling/descrambling process to prevent the false frame synchronization to the down communication channel data. Therefore, a scrambler and a descrambler can be eliminated. Accordingly, the scrambling portion 201 can be omitted from the center equipment 200, and the descrambling portion 411 can be omitted from the CATV terminal unit 600, which enables facilitation of respective portions and low cost of the CATV system. The configuration will be explained as a third embodiment hereinbelow.

Figure 8:
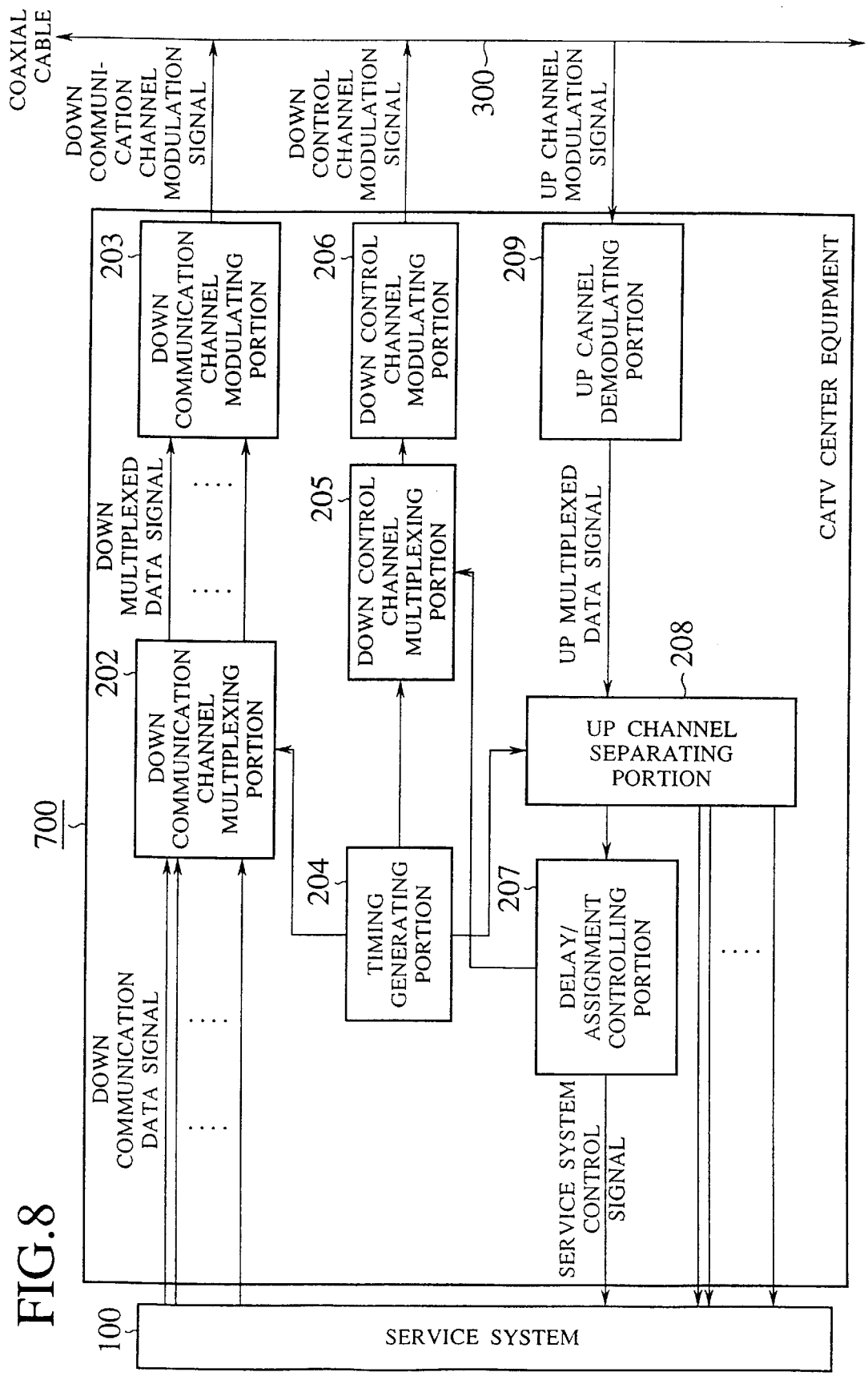
FIG. 8 is a block diagram showing a configuration of a third embodiment of a CATV center equipment according to the present invention.

FIG. 8 is a block diagram showing a configuration of a third embodiment of a CATV center equipment according to the present invention. In a center equipment 700 according to the third embodiment, data transmitted from the service system 100 can be multiplexed directly by the down communication channel multiplexing portion 202 without passing through the scrambling portion to prevent the false synchronization.

Figure 9:
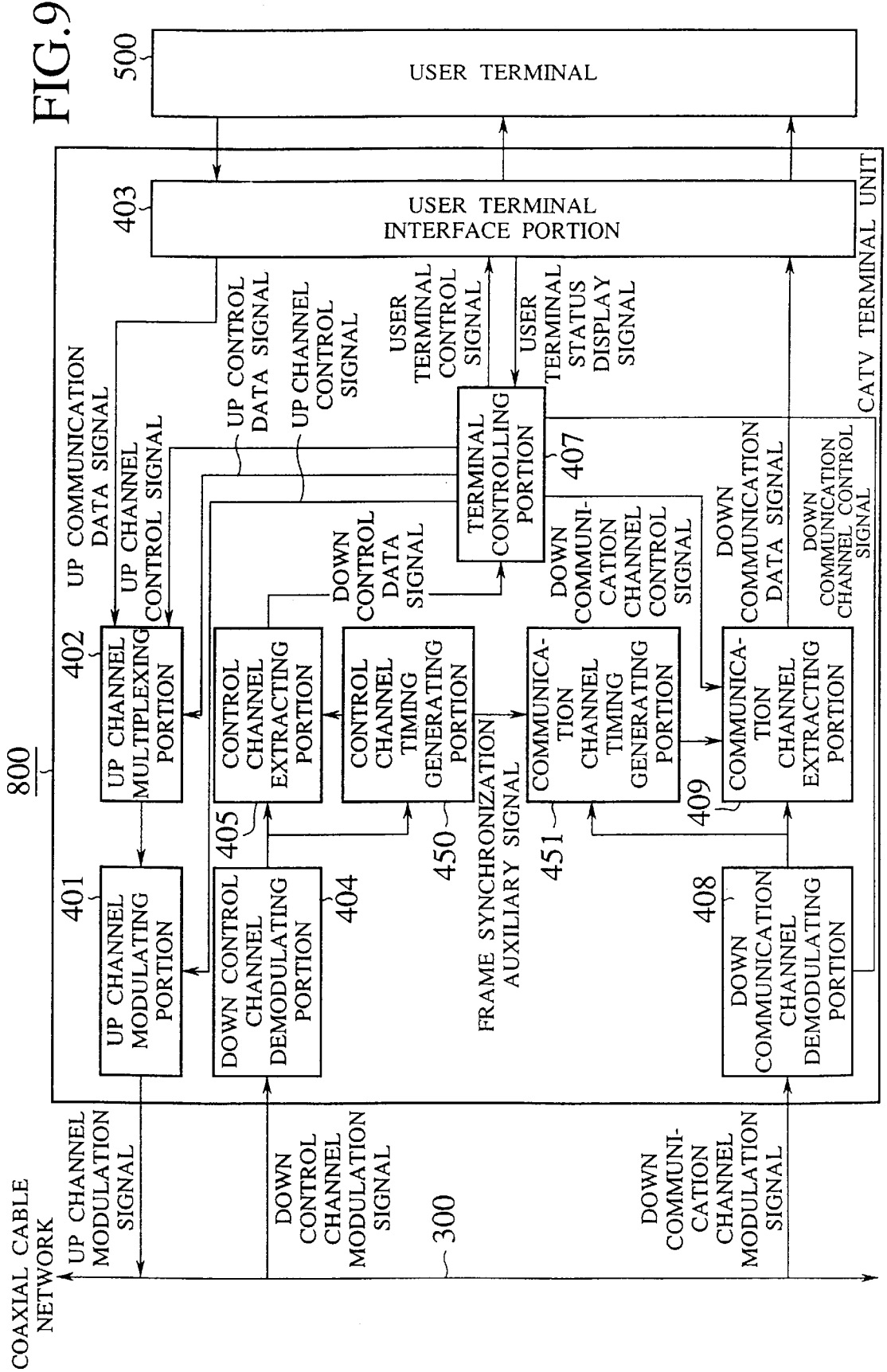
FIG. 9 is a block diagram showing a configuration of a third embodiment of a CATV terminal unit according to the present invention.

FIG. 9 is a block diagram showing a configuration of the third embodiment of a CATV terminal unit according to the present invention. In a CATV terminal unit 800 according to the third embodiment, data separated by a communication channel extracting portion 409, like the case in FIG. 7, are directly output as down communication data to a user terminal 500 via a user terminal interfacing portion 403 without passing through the descrambling portion.

Though preferred embodiments of the present invention have been described, the present invention is not limited to these embodiments. For instance, the number of carrier wave and the number of channel slot constituting respective frames shown in FIG. 4 are respectively an example. Therefore, it would be evident that the numbers of carrier wave and the channel slot other than these numbers may be selected within the scope of the present invention.

As stated earlier, according to the above embodiments of the present invention, the CATV terminal unit can search the idle up channel immediately and thus communicate with the center equipment.

In addition, since the frame synchronization timing for the down communication channel can be established by employing the frame synchronization timing for the down control channel, the frame synchronization can be established more quickly.

Furthermore, since the delay control is effected to only the carrier wave to which the delay control is needed, effective delay control can be accomplished.

What is claimed is:

1. A CATV communication system wherein channel slots are composed in compliance with a frequency division multiplex system and a time division multiplex access system in combination, and communication channels are established between a CATV center equipment and plural CATV terminal units in accordance with a demand-assignment system to communicate therebetween, wherein said CATV center equipment comprises a down control channel having a carrier wave different from those in a plurality of down communication channels and including information which indicates which channels of a plurality of up channels are available, said CATV terminal unit which has received a communication request issues a request for assignment of channel slot to said CATV center equipment via said up channel being available, and said CATV center equipment assigns a channel slot available for communication out of all channel slots constituting a plurality of up communication channels to said CATV terminal unit in response to said request for assignment of channel slot, wherein said CATV center equipment transmits information specifying said CATV terminal unit which is to be subjected to delay control and said up channel which is to be subjected to delay control out of a plurality of up channels by including in said down control channel, and said CATV center equipment and said CATV terminal unit specified by said information execute delay control to said up channel being specified.

2. A CATV communication system according to claim 1, wherein said CATV center equipment specifies in communication only said up channel concerning to said communication.

3. A CATV communication system according to claim 1, wherein said CATV center equipment specifies up channels other than said up channel concerning to said communication immediately after said communication has been completed.

4. A CATV communication system according to claim 1, wherein said CATV center equipment specifies only up channels in which delay control results in failure.

\* \* \* \* \*